United States Patent [19]
Nara et al.

[11] 3,926,973
[45] Dec. 16, 1975

[54] METHOD FOR SEPARATING CEPHALOSPORIN C

[75] Inventors: Kiyoshi Nara, Kyoto; Kazuhiko Ohta, Ikeda; Kazuyoshi Katamoto, Suita; Nariakira Mizokami, Suita; Hideo Fukuda, Osaka, all of Japan

[73] Assignee: Takeda Chemical Industries, Ltd., Japan

[22] Filed: Mar. 2, 1973

[21] Appl. No.: 337,473

[30] Foreign Application Priority Data
Mar. 2, 1972 Japan............................ 47-22157

[52] U.S. Cl............................. 260/243 C; 424/246
[51] Int. Cl.$^2$........................................ C07D 501/12
[58] Field of Search ........................... 260/243 C

[56] References Cited
UNITED STATES PATENTS
3,093,638  6/1973  Abraham et al. ............... 260/243 C Primary Examiner—Nicholas S. Rizzo
Attorney, Agent, or Firm—Wenderoth, Lind & Ponack

[57] ABSTRACT

Cephalosporin C can be separated with a high efficiency from a crude aqueous solution containing cephalosporin C such as a culture filtrate of a cephalosporin-producing microorganism by a novel method which comprises contacting the crude aqueous solution with activated carbon to allow cephalosporin C to be adsorbed on the carbon and subjecting the carbon to fractional elution with an alkaline mixture of water and an organic solvent to collect fractions containing cephalosporin C.

11 Claims, No Drawings

METHOD FOR SEPARATING CEPHALOSPORIN C

The present invention relates to a method for separating cephalosporin C from a crude aqueous solution containing cephalosporin C.

For the purpose of separating cephalosporin C from culture filtrates of cephalosporin C-producing microorganisms (e.g., the Cephalosporium microorganisms), there have hitherto been proposed a chromatographic process with the employment of anion exchange resins, as reported, e.g. in "Pharmacological Reviews", 14 (1962), 479 and 480. However, this process is still accompanied by such drawbacks that cephalosporin C cannot be sufficiently separated from the impurities (e.g., cephalosporin N, pigments and salts) inevitably contained in the culture filtrates and that it requires not only an extremely large amount of a complicated eluent (i.e. a buffer solution containing a tertiary amine together with sulfuric acid or oxalic acid) but also very troublesome regeneration procedures for repeated use of the anion exchange resins. Therefore, establishment of an industrially feasible chromatographic process for the separation of cephalosporin C which is released from the above-mentioned drawbacks has been a long desideratum in the art.

The present inventors have unexpectedly found that cephalosporin C can be substantially separated without degradation thereof from cephalosporin N, pigments and salts contained in the culture filtrates of the cephalosporin-producing microorganisms by the particular sequence of the specific steps, i.e. by contacting the culture filtrate with activated carbon to allow cephalosporin C to be adsorbed on the carbon and subjecting the cephalosporin C-adsorbing carbon to fractional elution with an alkaline mixture of water and an organic solvent. Taking into consideration that cephalosporin C is known to be very unstable under alkaline conditions, the fact that cephalosporin C can be fractionally eluted without degradation thereof from the cephalosporin C-adsorbing activated carbon with an alkaline mixture of water and an organic solvent is a surprising finding. Moreover, even when use is made as the eluent of a neutral or acidic mixture of water and an organic solvent, or water adjusted to an alkaline region, cephalosporin C cannot be separated from the impurities, especially from the pigments.

The present invention has been accomplished on the basis of said findings, and, its principal object is to provide a novel and industrially feasible method for separating cephalosporin C from such a crude aqueous solution containing cephalosporin C as a culture filtrate of a cephalosporin C-producing microorganism, in which cephalosporin C can be separated with a high efficiency from the impurities including pigments and salts with the employment of a small amount of the eluent and the adsorbent can be employed in almost inexhaustible times without any specific regeneration procedure.

In the method of the present invention, a crude aqueous solution containing cephalosporin C is contacted with activated carbon to allow cephalosporin C to be adsorbed on the carbon. As the crude aqueous solution containing cephalosporin C, there may be enumerated, for example, culture broths of cephalosporin C-producing microorganisms, and their processed fluids containing cephalosporin C such as culture filtrates, washings, concentrates and fluids which are obtainable upon pH adjustment thereof. Practically, these solutions are adjusted to a pH from about 4.5 to about 6.8 with e.g. dilute sulfuric acid, especially from about 5.0 to about 6.0, before the contact with the activated carbon.

As the activated carbon, use may be made of, for example, the carbon products which are obtainable by the carbonization and subsequent steam or chemical (e.g., by means of zinc chloride) activation of saw dust, coconut shells, coal and the like. Activated carbons which have been activated by zinc chloride are particularly advantageous. These activated carbons may be employed in granular form or powdery form. Among these activated carbons, it is advantageous to employ those having the grain size ranging from about 10 to 50 meshes and the surface area ranging from about 300 to about 2,000 $m^2/g$, especially from about 600 to about 1,500 $m^2/g$.

To allow cephalosporin C to be adsorbed on the activated carbon, any procedure including the batchwise contact may be followed. From the viewpoint of the sufficient separation by the subsequent elution, it is advantageous to pass the crude aqueous solution containing cephalosporin C through a column packed with activated carbon in a descending run. The optimal space velocity (volume of the crude aqueous solution to be run per volume of the activated carbon per hour) in this descending run varies with such factors as the concentration of cephalosporin C in the crude aqueous solution and the length of the activated carbon column. The most practical space velocity to allow cephalosporin C to be adsorbed substantially on the activated carbon ranges from about 0.1 to 2.0 per hour, especially from about 0.5 to about 2.0 per hour.

When the crude aqueous solution is contacted with the activated carbon by the batchwise contact, i.e. by admixing the solution with the carbon, the cephalosporin C-adsorbing carbon is filled in a column prior to the subsequent elution step.

By the above-mentioned contacting operation of the crude aqueous solution containing cephalosporin C with activated carbon, substantially the entire amount of cephalosporin C contained in the solution is adsorbed on the activated carbon; in the meanwhile, cephalosporin N and pigments among the impurities contained in the solution are also adsorbed on the carbon. This adsorption operation may be continued until the activated carbon has adsorbed a saturated amount of cephalosporin C with the result that its cephalosporin C-adsorbing activity has dropped. It is advantageous to wash the activated carbon which has sufficiently adsorbed cephalosporin C with water before the following elution.

According to the method of the present invention, cephalosporin C and other solutes thus adsorbed on the activated carbon are fractionally eluted from the carbon with an alkaline mixture of water and an organic solvent. As the organic solvent, there may be counted hydrophilic organic solvents such as lower alcohols (e.g. methanol, ethanol, propanol, isopropanol, butanol, isobutanol), especially those having up to 5 carbon atoms; lower ketones (e.g. acetone, methyl ethyl ketone), especially those having up to 4 carbon atoms; lower alkyl esters of lower fatty acids (e.g. methyl acetate, ethyl acetate, methyl propionate), especially those having up to 7 carbon atoms; cyclic ethers (e.g. dioxane, tetrahydrofuran); and mixtures thereof. The ratio of water and the organic solvent in the mixture may be chosen upon such factors as the types of the organic solvents. Generally, the optimal ratio of water and the organic solvent ranges from about 15:1 to 1:3 by volume, especially from about 15:1 to about 1:1 by volume. Such a mixture of water and an organic solvent is alkalinized before use. For this purpose, it is practical to adjust the mixture to a suitable alkalinity with a base, such as the hydroxide of an alkali metal, alkaline earth metal or the like (e.g. sodium hydroxide, potassium hydroxide, calcium hydroxide, magnesium hydroxide, etc.); ammonia; or an organic amine such as trimethylamine. While the optimal alkalinity varies somewhat with such factors as the types of the organic solvents, it is generally in the pH range from about 7.5 to about 13.0 and, especially from about 9.5 to about 12.0.

Practically, the above-mentioned alkaline mixture is passed through the column of the cephalosporin C-adsorbing activated carbon in a descending run and the eluate is collected in fixed fractions, whereby cephalosporin C is eluted into different fractions from those of other adsorbed solutes including cephalosporin N and pigments. The optimal space velocity (volume of the alkaline mixture to be run per volume of the activated carbon per hour) in this fractional elution varies with such factors as the amount of cephalosporin C adsorbed on the carbon, the types of the organic solvents employed and the length of the activated carbon column. The most advantageous space velocity ranges from about 0.1 to about 2.0 per hour, especially from about 0.3 to about 0.8 per hour.

The cephalosporin C fractions may be collected by monitoring, for example, the cephalosporin C activity or the optical density at 260 m$\mu$ of the respective fractions. Thus-obtained cephalosporin C fractions contain a high concentration of cephalosporin C separated from cephalosporin N, pigments, salts and other impurities. Cephalosporin C may be recovered from the cephalosporin C fractions by a per se known technique, e.g..by concentrating the fractions to cause cephalosporin C to crystallize as, e.g. the corresponding alkali salt, which may be separated from the mother fluid and dried. Moreover, the method of this invention may be worked in conjunction with various other purification processes, one of advantageous combinations comprising subjecting the cephalosporin C fractions obtained by the method of the present invention to acylation reaction and, then recovering the resulting fat-soluble acylated derivative from the reaction mixture.

By the above-mentioned elution of the activated carbon with the alkaline mixture of water and the organic solvent, cephalosporin C and other solutes adsorbed on the carbon are desorbed into the eluent and the activated carbon is regenerated. Thus-regenerated activated carbon may be reused in the next adsorption of cephalosporin C and the activated carbon can be employed in almost inexhaustible repetition through the cycles of the adsorption and elution.

Throughout the present specification as well as claims the abbreviations "$\mu$g", "g", "kg.", "ml.", "l", "cm", "m$^2$", "N" and "°C" respectively refer to "microgram(s)", "milligram(s)", "gram(s)", "kilogram(s)", "milliliter(s)", "liter(s)", "centimeter(s)", "square meter(s)", "Normal(s)" and "degree(s) centigrade"; "mesh" is that of Tyler standard sieve, "surface area" is that measured by Brunauer, Emett & Teller (B.E.T.) method described in, e.g., "Journal of the American Chemical Society", 60, 309(1938), titers of cephalosporins C and N are those measured by the bioassay method described in, e.g. "Antimicrobial Ageents and Chemotherapy", (1962), 682, and percentages are volume/volume unless otherwise specified.

EXAMPLE 1

A cephalosporin-producing microorganism of the genus Cephalosporium (*Sephalosporium acremonium* ATCC-14553 which is listed in "The American Type Culture Collection, Catalogue of Strains, 9th edition, 1970") was cultivated on a potato-dextrose-agar slant for 7 days to obtain a good growth. A flask of 2l capacity was filled with 500 ml of a medium (pH 6.8) comprising 1.5% of meat extract, 0.5% of corn steep liquor, 3.0% of sucrose and 0.15% of calcium carbonate, followed by sterilization by autoclaving. The flask was inoculated with spores from the slant culture obtained above and incubated at 28°C under shaking for 3 days.

A stainless-steel fermentation tank was filled with 25l of a medium comprising 3.0% of raw soybean meal, 10% of sucrose, 1% of DL-methionine, 0.15% of calcium chloride, 3.0% of cottonseed flour and 0.05% of soybean oil. After sterilization at high pressure and cooling, the tank was aseptically inoculated with the above preculture and incubated at 24°C under aeration and stirring (100% aeration per minute, 280 r.p.m.).

After 140 hours of cultivation, the culture broth (25l) was withdrawn from the tank and adjusted to pH 5.0 with dilute sulfuric acid. Then, 0.5 kg. of Hyflo Super Cel (Johns & Manville Co., U.S.A.) was added as a filter-aid and the cells were removed by means of a filter press precoated with 0.25 kg. of Hyflo Super Cel.

The resultant clear reddish-brown filtrate was found to contain 2,000 $\mu$g/ml of cephalosporin C and 1,000 $\mu$g/ml of cephalosporin N.

2,000 ml of the above culture filtrate was passed through a column (61 cm in height and 3.7 cm in diameter) packed with 550 ml of chromatographic carbon in grain size of about 40 meshes having a surface area of 1460 m$^2$/g at a space velocity of 0.9 per hour and, then, the column was washed with 1,000 ml of pure water. The effluent was pooled with the washings and the combined solution was subjected to thin-layer chromatography on microcrystalline cellulose in a solvent system of n-butanol-glacial acetic acid-water (3:1:1 by volume). The chromatogram revealed a spot at Rf 0.3 for cephalosporin N and a few other spots distinguishable from the spot assignable to cephalosporin C, which gave positive ninhydrin and iodine reactions.

The column was eluted with a solvent mixture (pH 12.0) of 2,000 ml of a 7% (by volume) aqueous solution of n-butanol and 200 ml of a 0.1N aqueous solution of sodium hydroxide at a space velocity of 0.45 per hour and the eluate was collected in 50 ml fractions. The amounts of cephalosporin C in these fractions were monitored by reading the optical densities (absorbances) of each fraction at 260 m$\mu$ for cephalosporin C and 420 m$\mu$ for pigments on the Bechmann spectrophotometer.

The optical density at 260 m$\mu$ underwent a steep rise starting with fraction 15, reached a peak at fraction 20 and whence dropped until it was near zero at fraction 30. The absorbance of fraction 20 was 320 and the titer of cephalosporin C in the same fraction was 12,000 $\mu$g/ml.

The optical density at 420 m$\mu$ started rising steeply at fraction 23, reached a peak at fraction 27 and whence dropped until it was near zero at fraction 30. The optical densities of fraction 27 were 1.2 at 420 m$\mu$ and 100 at 260 mμ and the titer of cephalosporin C in this fraction was 2,500 μg/ml.

Fractions 10 through 18 were pooled and subjected to thin-layer chromatography on microcrystalline cellulose in a solvent system of n-butanol-glacial acetic acid-water (3:1:1 by volume). The chromatogram revealed the spot assignable to cephalosporin N and a few other spots giving positive ninhydrin and iodine tests. Substantially no spot could be detected at the Rf2.0 corresponding to cephalosporin C.

Pale-yellow fractions 19 through 26, which predominantly contained cephalosporin C, were pooled, adjusted to pH 6.5 with 1N sodium hydroxide and concentrated at an external temperature of not higher than 30°C. The resultant crystals of cephalosporin C sodium salt were harvested by filtration and dried, whereupon 960 mg. of substantially colorless crystals were obtained as a first crop.

Repetition of the above procedure gave further crops of crystals from mother fluids. Total: 2.21g. A bioassay against an authentic sample ($\epsilon_{1cm}^{1\%}=190$) of cephalosporin C sodium showed that the content of cephalosporin C sodium in the above crystals was 90.6% by weight. The activity yield of cephalosporin C from the culture filtrate was approximately 50%. The thin-layer chromatogram of the product on microcrystalline cellulose in a solvent system of n-butanol-glacial acetic acid-water (3:1:1) revealed a spot at Rf 0.2 for cephalosporin C and a trace spot at Rf 0.3. To obtain a pure product of cephalosporin C, the above product was recrystallized from 10 ml of a mixture of water and ethanol (1:1 by volume). The yield after recrystallization was 1.68 g. The thin-layer chromatogram and ultraviolet and infrared absorption spectra of this product were in complete agreement of the authentic sample.

EXAMPLE 2

Under the same conditions as described in Example 1, 2,000 ml of the culture filtrata obtained in Example 1 was passed through an activated carbon column under the same conditions as described in Example 1 and the column was washed with water. Then, the column was eluted with a solvent mixture (pH 11.5) of 2,000 ml of a 7% (by volume) aqueous solution of n-butanol and 100 ml of a 0.1N aqueous solution of potassium hydroxide at a space velocity of 0.5 per hour and the eluate was collected in 50 ml fractions. Each fraction was assayed by the same procedures as described in Example 1.

The optical density patterns of the fractions at 260mμ and 420 mμ were substantially identical with the patterns obtained in Example 1. The thin-layer chromatogram of each fraction was assayed by ninhydrin and iodine tests and pale-yellow fractions 27 to 36, which predominantly contained cephalosporin C, were pooled. The combined solution was passed down a column (40×2.5cm) packed with 200 ml of strongly acidic cation exchange resin (free form, such as Amberlite IR-120 sold by Rohm and Haas Co., U.S.A.) at the space velocity of 1.0 per hour to remove the potassium ion, followed by washing with 400 ml of water. The effluent (inclusive of washings) was adjusted to pH 6.5 with 1N sodium hydroxide and concentrated at an external temperature of not higher than 30°C. The resultant crystals of cephalosporin C sodium salt were harvested by filtration and dried, whereupon 1,000 mg. of substantially colorless crystals were obtained as a first crop. Further crops of crystals were harvested from mother liquors to obtain a total of 2.26 g. As assayed against an authentic sample ($\epsilon_{1cm}^{1\%}=190$) of cephalosporin C sodium, the cephalosporin C sodium content of the above crystals was 92% by weight. The yield of cephalosporin C activity from the culture filtrate was 52%. This product was recrystallized from 2 ml of water to obtain 1.6 g. of a pure product. The thin-layer chromatogram and ultraviolet and infrared absorption spectra of this product were in complete agreement with those of the authentic sample.

EXAMPLE 3

Under the same conditions as described in Example 1, 2,000 ml of the culture filtrate obtained in Example 1 was passed through an activated carbon column under the same conditions as described in Example 1 and the column was washed with water. Then, the column was eluted with a solvent mixture (pH 10.6) of 2,000 ml of a 7% (by volume) aqueous solution of n-butanol and 200 ml of a 0.1 N aqueous ammonia at a space velocity of 0.45 per hour and the elute was collected in 50 ml fractions. These fractions were scanned by the same procedures as described in Example 1. Pale yellow fractions 23 through 32, which predominantly contained cephalosporin C, were pooled. The ammonia was evaporated at a low temperature of not higher than 30°C and, then, was removed batchwise by the addition of 200 ml. of strongly acidic cation exchange resin (free form, such as Amberlite IR-120 sold by Rohm and Haas Co., U.S.A.), followed by washing with 400 ml of water. The filtrate and washings were pooled, adjusted to pH 6.5 with 1N sodium hydroxide and concentrated at an external temperature of not higher than 30°C. The resulting crystals of cephalosporin C sodium were harvested by filtration and dried, whereupon 800 mg. of substantially colorless crystals were obtained as a first crop. Repeated crystallization from mother liquors yielded a total of 2.22 g. A bioassay against an authentic sample ($\epsilon_{1cm}^{1\%}=190$) of cephalosporin C sodium showed that the cephalosporin C sodium content of the product was 90% by weight. The activity yield from the culture filtrate was 50%. The product was further recrystallized from 1.1 ml of water to obtain 1.5 g. of a pure product. The thin-layer chromatogram and ultraviolet and infrared absorption spectra of this pure product were in complete agreement with those of the authentic sample.

EXAMPLE 4

150 ml of the culture filtrate obtained in Example 1 was passed through a column (30 cm in height and 2 cm in diameter) packed with 50 ml of chromatographic activated carbon in grain size of about 40 meshes having a surface area of 1,500 m²/g at a space velocity of 1.0 per hour. After washing with 250 ml of water, the column was eluted with a solvent mixture (pH 12.0) of 1,000 ml of a 7% (by volume) aqueous solution of ethyl acetate and 100 ml of a 0.1N aqueous solution of sodium hydroxide at a space velocity of 0.5 per hour and the eluate was collected in 50 ml fractions. These fractions were scanned by the same procedures as described in Example 1.

The optical density at 260 mμ underwent a steep rise starting with fraction 10, reached a peak at fraction 12 and whence dropped until it was near zero at fraction 20. On the other hand, the optical density at 420 mμ increased gradually from fraction 14 and onwards, reached a peak at fraction 17 and whence dropped until it was near zero at fraction 25.

Pale yellow fractions 10 through 16, which predominantly contained cephalosporin C, were pooled, adjusted to pH 6.5 with 1N sodium hydroxide and concentrated at an external temperature of not higher than 30°C. The resultant crystals of cephalosporin C sodium salt were harvested by filtration and dried, whereupon 100 mg. of substantially colorless crystals were obtained as a first stop.

Repeated crystallization from mother liquors yielded a total of 170 mg. of crystals. A bioassay against an authentic sample ($\epsilon_{1cm}^{1\%}=190$) of cephalosporin C sodium showed that the cephalosporin C sodium content of the product was 91% by weight. The yield of cephalosporin C activity from the culture filtrate was 51.6%. Recrystallization from 0.2 ml of water yielded 120 mg. of a pure product. The physicochemical properties of this product were in complete agreement with those of the authentic sample.

EXAMPLE 5

Under the same conditions as set forth in Example 4, 150 ml of the culture filtrate obtained in Example 1 was passed through a column of activated carbon which was then washed with 250 ml of water. Then, the column was eluted with a solvent mixture (pH 11.9) of 200 ml of a 50% (by volume) aqueous solution of dioxane and 20 ml of a 0.1N aqueous solution of sodium hydroxide at a space velocity of 0.5 per hour and the eluate was collected in 10 ml fractions. These fractions were scanned by the same procedures as described in Example 1. The optical density at 260 m$\mu$ showed a steep rise starting with fraction 5, reached a peak at fraction 7 and whence dropped until it was near zero at fraction 10. On the other hand, the optical density at 420 m$\mu$ increased gradually from fraction 7 and onwards, reached a peak at fraction 10 and whence dropped until it was near zero at fraction 15.

Pale yellow fractions 5 to 9, which predominantly contained cephalosporin C, were pooled, adjusted to pH 6.5 with 1N sodium hydroxide and concentrated at an external temperature of not higher than 30°C. The resultant crystals of cephalosporin C sodium were harvested by filtration and dried, whereupon 80 mg. of substantially colorless crystals were obtained as a first crop. Repeated crystallization from mother liquors yielded a total of 168 mg. A bioassay against an authentic sample ($\epsilon_{1cm}^{1\%}=190$) of cephalosporin C sodium salt showed that the purity of this product was 90% by weight. The yield of cephalosporin C activity from the culture filtrate was 50.5%. Recrystallization from 0.5 ml of a mixture of water and ethanol (1:1 by volume) yielded 110 mg. of a pure product. The thin-layer chromatogram, optical rotation and ultraviolet and infrared absorption spectra of this product were in complete agreement with those of the authentic sample of cephalosporin C sodium.

EXAMPLE 6

Under the same conditions as set forth in Example 4, 150 ml of the culture filtrate obtained in Example 1 was passed through a column of activated carbon which was then washed with 250 ml of water. Then, the column was eluted with a solvent mixture (pH 12.1) of 200 ml of a 50% (by volume) aqueous solution of acetone and 20 ml of a 0.1N aqueous solution of sodium hydroxide at a space velocity of 0.5 per hour and the eluate was collected in 10 ml fractions. These fractions were scanned by the thin-layer chromatography described in Example 1.

Pale yellow fractions 5 to 9, which predominantly contained cephalosporin C, were pooled, adjusted to pH 6.5 with 1N sodium hydroxide and concentrated at an external temperature of not higher than 30°C. The resultant crystals of cephalosporin C sodium were harvested by filtration and dried, whereupon 75 mg. of substantially colorless crystals were obtained as a first crop. Repeated crystallization from mother liquors yielded a total of 162 mg. A bioassay against an authentic sample ($\epsilon_{1cm}^{1\%}=190$) of cephalosporin C sodium salt showed that the purity of this product was 92% by weight. The yield of cephalosporin C activity from the culture filtrate was 49%. Recrystallization from 0.5 ml of a mixture of water and ethanol (1:1 by volume) yielded 105 mg. of a pure product. The thin-layer chromatogram, optical rotation and ultraviolet and infrared absorption spectra of this product were in complete agreement with those of the authentic sample of cephalosporin C.

Having thus disclosed the invention, what is claimed is:

1. In a method for separating cephalosporin C from a culture broth of a cephalosporin C-producing microrganism or its processed fluid containing cephalosporin C, the improvement which comprises contacting said broth or processed fluid containing cephalosporin C with activated carbon to allow cephalosporin C to be adsorbed on the carbon and subjecting the carbon to fractional elution with a mixture of water and a hydrophilic organic solvent adjusted to a pH of from about 7.5 to about 13.0 to collect fractions containing cephalosporin C.

2. A method according to claim 1, wherein the pH value ranges from about 9.5 to about 12.0.

3. A method according to claim 1, wherein water and the organic solvent in the alkaline mixture are in a ratio of from about 15:1 to about 1:3 by volume.

4. A method according to claim 1, wherein the organic solvent is a lower alcohol, a lower ketone, a lower alkyl ester of a lower fatty acid or a cyclic ether.

5. A method according to claim 1, wherein the contact of the crude aqueous solution with activated carbon is conducted by passing the crude aqueous solution through a column packed with activated carbon and the elution is conducted by passing the alkaline mixture through the activated carbon column having adsorbed cephalosporin C.

6. A method according to claim 5, wherein the crude aqueous solution is passed through the column at a space velocity of from about 0.1 to about 2.0 per hour.

7. A method according to claim 5, wherein the alkaline mixture is passed through the column at a space velocity of from about 0.1 to about 2.0 per hour.

8. A method according to claim 1, wherein the activated carbon has the grain size ranging from about 10 to about 50 meshes and the surface area ranging from about 300 to about 2,000 m$^2$/g.

9. A method according to claim 1 wherein cephalosporin C is separated from the culture broth of a cephalosporin C-producing microorganism containing cephalosporin C, cephalosporin N, pigments and salts.

10. A method according to claim 9 wherein said microorganism is of the genus Cephalosporium.

11. A method according to claim 1 wherein the processed fluid of said culture broth is a filtrate, washing or concentrate of pH adjusted fluid thereof.

* * * * *